United States Patent
Kim et al.

(10) Patent No.: US 12,304,129 B2
(45) Date of Patent: May 20, 2025

(54) EXTERIOR FOR SECONDARY BATTERY AND APPARATUS AND METHOD FOR MANUFACTURING EXTERIOR FOR SECONDARY BATTERY

(71) Applicant: LG Energy Solution, Ltd., Seoul (KR)

(72) Inventors: Hyun Beom Kim, Daejeon (KR); Nam Jin Jang, Daejeon (KR); Gi Man Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 801 days.

(21) Appl. No.: 17/437,568

(22) PCT Filed: Mar. 25, 2020

(86) PCT No.: PCT/KR2020/004074
§ 371 (c)(1),
(2) Date: Sep. 9, 2021

(87) PCT Pub. No.: WO2020/204453
PCT Pub. Date: Oct. 8, 2020

(65) Prior Publication Data
US 2022/0158282 A1    May 19, 2022

(30) Foreign Application Priority Data
Apr. 1, 2019 (KR) .......... 10-2019-0037774

(51) Int. Cl.
*B29C 49/06* (2006.01)
*B29C 49/02* (2006.01)
(Continued)

(52) U.S. Cl.
CPC ........ *B29C 49/06912* (2022.05); *B29C 51/08* (2013.01); *B29C 51/10* (2013.01);
(Continued)

(58) Field of Classification Search
None
See application file for complete search history.

(56) References Cited

U.S. PATENT DOCUMENTS

2016/0001491 A1*  1/2016  Desoutter ............... B29C 49/58
                                                        425/528
2018/0243966 A1   8/2018  Oh et al.
(Continued)

FOREIGN PATENT DOCUMENTS

JP    H08080562 A    3/1996
JP    H11028763 A    2/1999
(Continued)

OTHER PUBLICATIONS

Machine translation of JP 09-057844 A.*
(Continued)

*Primary Examiner* — Jonathan G Leong
*Assistant Examiner* — Tony S Chuo
(74) *Attorney, Agent, or Firm* — Lerner David LLP (57) ABSTRACT

A method for manufacturing an exterior for a secondary battery includes a first step of preparing a sheet and a mold in which a recess part is formed; a second step of locating the sheet so that a portion of the sheet faces the recess part of the mold; and a third step of supplying a fluid from a side of the mold toward the recess part to form a forming part having a shape corresponding to a shape of the recess part in an area of the sheet, which is provided on the recess part. An exterior for a secondary battery and an apparatus for manufacturing the exterior for the secondary battery are also provided.

6 Claims, 8 Drawing Sheets

(51) Int. Cl.
  *B29C 51/08* (2006.01)
  *B29C 51/10* (2006.01)
  *H01M 50/124* (2021.01)
  *H01M 50/186* (2021.01)
  *B29L 31/00* (2006.01)
  *H01M 50/105* (2021.01)

(52) U.S. Cl.
  CPC ....... *H01M 50/124* (2021.01); *H01M 50/186* (2021.01); *B29L 2031/7146* (2013.01); *H01M 50/105* (2021.01)

(56) References Cited

U.S. PATENT DOCUMENTS

| | | |
|---|---|---|
| 2018/0264708 A1 | 9/2018 | Oh et al. |
| 2019/0051868 A1 | 2/2019 | Lee et al. |
| 2020/0083493 A1 | 3/2020 | Lee |
| 2020/0365836 A1 | 11/2020 | Jung et al. |
| 2022/0184875 A1 | 6/2022 | Oh et al. |

FOREIGN PATENT DOCUMENTS

| | | |
|---|---|---|
| JP | H11045688 A | 2/1999 |
| JP | 2003276075 A | 9/2003 |
| JP | 5089861 B2 | 12/2012 |
| JP | 2018532233 A | 11/2018 |
| JP | 2019502241 A | 1/2019 |
| KR | 20060067809 A | 6/2006 |
| KR | 20100082678 A | 7/2010 |
| KR | 20170108846 A | 9/2017 |
| KR | 20170118602 A | 10/2017 |
| KR | 20180082890 A | 7/2018 |
| KR | 20180134133 A | 12/2018 |
| KR | 20190010434 A | 1/2019 |
| WO | 2019054642 A1 | 3/2019 |

OTHER PUBLICATIONS

Machine translation of JP 2003-276075 A.*
International Search Report for PCT/KR2020/004074 mailed Jul. 8, 2020; 2 pages.

* cited by examiner

FIG. 1

PRIOR ART

EXTERIOR FOR SECONDARY BATTERY AND APPARATUS AND METHOD FOR MANUFACTURING EXTERIOR FOR SECONDARY BATTERY

CROSS-REFERENCE TO RELATED APPLICATIONS

The present application is a national phase entry under 35 U.S.C. § 371 of International Application No. PCT/KR2020/004074, filed on Mar. 25, 2020, published in Korean, which claims the benefit of the priority of Korean Patent Application No. 10-2019-0037774, filed on Apr. 1, 2019, both of which are hereby incorporated by reference in their entireties.

TECHNICAL FIELD

The present invention relates to an exterior for a secondary battery and an apparatus and method for manufacturing the exterior for the secondary battery, and more particularly, to an exterior for a secondary battery, which improves space utilization when compared to the related art, and an apparatus and method for manufacturing the exterior for the secondary battery.

BACKGROUND ART

Secondary batteries that are repetitively chargeable and dischargeable may be divided into cylindrical type secondary batteries, prismatic type secondary batteries, and pouch type secondary batteries according to their manufacturing methods or structures. Among them, the pouch type secondary battery has a structure in which an electrode assembly having a structure in which electrodes and separators are alternately disposed in a sheet-shaped pouch exterior is accommodated. In particular, the pouch type secondary battery has been widely used due to its relatively simple process and low manufacturing cost.

According to the related art, in order to manufacture the pouch type secondary battery, a forming process, in which a portion of an area of a pouch having a sheet shape is pressed by an area corresponding to an area of the electrode assembly to form a cup having a recessed shape, is performed, and then, the electrode assembly is mounted in the cup formed in the pouch. Thereafter, portions of the area of the pouch are attached to each other to form a sealing part.

Figure 1:
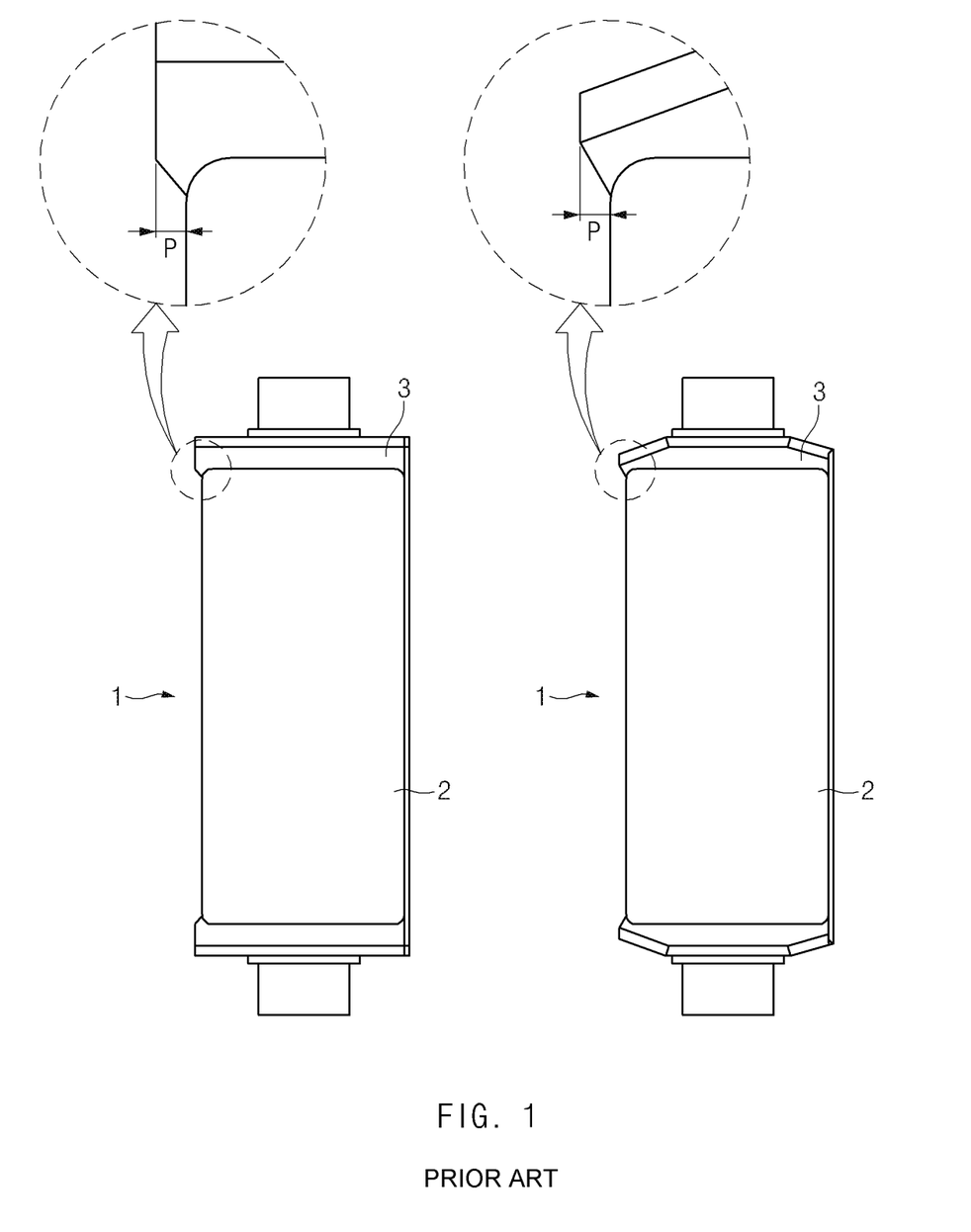
FIG. 1 is a view illustrating a structure of a secondary battery manufactured according to a related art.

The sealing part formed by attaching the portions of the area of the pouch to each other is formed by attaching areas that are not pressed in the forming process. Thus, a portion of an area of the sealing part may be deviated from a width of the cup due to a stepped portion between the sealing part, on which the forming process is not performed, and the cup, on which the forming process is performed. FIG. 1 illustrates a state in which a portion of an area of a sealing part 3, which is provided in each of upper and lower portions of a pouch 2 of a pouch type secondary battery 1, which is manufactured according to the related art, is deviated by a width P from a width of a cup in which the electrode assembly is accommodated.

As described above, the protruding region may act as a cause of an increase in dead space that is not contributed in capacity of the secondary battery, resulting in causing a problem that energy density of the secondary battery is reduced.

DISCLOSURE OF THE INVENTION

Technical Problem

Therefore, an object achieved by the present invention is to remove a dead space that occurs in a sealing part of a pouch type secondary battery manufactured according to a related art to increase in energy density of a secondary battery.

Technical Solution

According to a first aspect of the present invention for achieving the above object, a method for manufacturing an exterior for a secondary battery comprises: a first step of preparing a sheet and a mold in which a recess part having a recessed shape is formed; a second step of locating the sheet so that a portion of the sheet faces the recess part of the mold; and a third step of supplying a fluid from a side of the mold toward the recess part to form a forming part having a shape corresponding to a shape of the recess part in an area of the sheet, which is provided on the recess part.

In the first step, the mold may comprise a first mold and a second mold provided above the first mold, and in the second step, a portion of the sheet may be provided between the first mold and the second mold, wherein a recess part of the first mold and a recess part of the second mold may be provided to face each other.

In the second step, the sheet is folded, and the sheet may be disposed between the first mold and the second mold in a state in which the sheet is divided into a first sheet part and a second sheet part by using a folded area as a boundary, and in the third step, the fluid may be introduced between the first sheet part and the second sheet part.

The fluid may be air or a liquid that does not react with the sheet.

In the third step, a circumference of the recess part of the first mold of the mold and a circumference of the recess part of the second mold of the mold may be pressed with respect to each other to seal an inner space formed by the recess part of the first mold and the recess part of the second mold, which face each other, from an outside.

In the second step, the sheet may be disposed so that a portion of an area of the recess part faces the sheet, and another portion of the area of the recess part does not face the sheet.

In the third step, an area of the sheet, which faces the recess part is elongated by the supplied fluid, and at least a portion of the another portion of the area of the recess part, which does not face the sheet in the second step, may face the sheet.

According to a second aspect of the present invention for achieving the above object, an apparatus for manufacturing an exterior for a secondary battery comprises: a mold in which a recess part) having a recessed shape is provided; and a fluid supply device configured to supply a fluid toward the recess part, wherein the fluid supply device comprises: a duct extending from a side of the mold toward the recess part to provide a path through which the fluid flows.

The mold may comprise a first mold and a second mold, one or more grooves may be defined in each of the first mold and the second mold, a recess part of the first mold and a recess part of the second mold may be provided to face each other, the one or more grooves of the first mold and the one or more grooves of the second mold may be provided to face each other, and the duct may be configured to be inserted into a hole defined by the one or more grooves of the first mold and the one or more grooves of the second mold, which face each other.

The duct may extend up to the recess part of the first mold and the recess part of the second mold.

The duct may extend up to the one or more grooves of the first mold and the one or more grooves of the second mold.

The hole defined by the one or more grooves of the first mold and the one or more grooves of the second mold, which face each other, may be provided in plurality.

A vertical cross-section of the hole defined by the one or more grooves of the first mold and the one or more grooves of the second mold, which face each other, may have a circular shape, an oval shape, or a rectangular shape.

According to a third aspect of the present invention for achieving the above object, an exterior for a secondary battery comprises: a forming part having a predetermined thickness and defining a space therein; and a sealing part disposed on a circumference of the forming part, wherein an entire area of the sealing part has a structure in which two sheets are bonded to each other, and the sealing part is spaced a predetermined length from one side surface of the forming part.

The circumference of the forming part may be constituted by the one side surface and three additional side surfaces, the sealing part may be disposed along the three additional side surfaces of the forming part, and the sealing part may be spaced the predetermined length from the one side surface of the forming part, on which the sealing part is not disposed.

Advantageous Effects

According to the present invention, the dead space occurring in the sealing part of the pouch type secondary battery manufactured according to the related art may be removed to increase in energy density of the secondary battery.

MODE FOR CARRYING OUT THE INVENTION

Hereinafter, a structure of an apparatus for manufacturing an exterior for a secondary battery according to the present invention will be described with reference to the accompanying drawings.

Apparatus for Manufacturing Exterior for Secondary Battery

Figure 2:
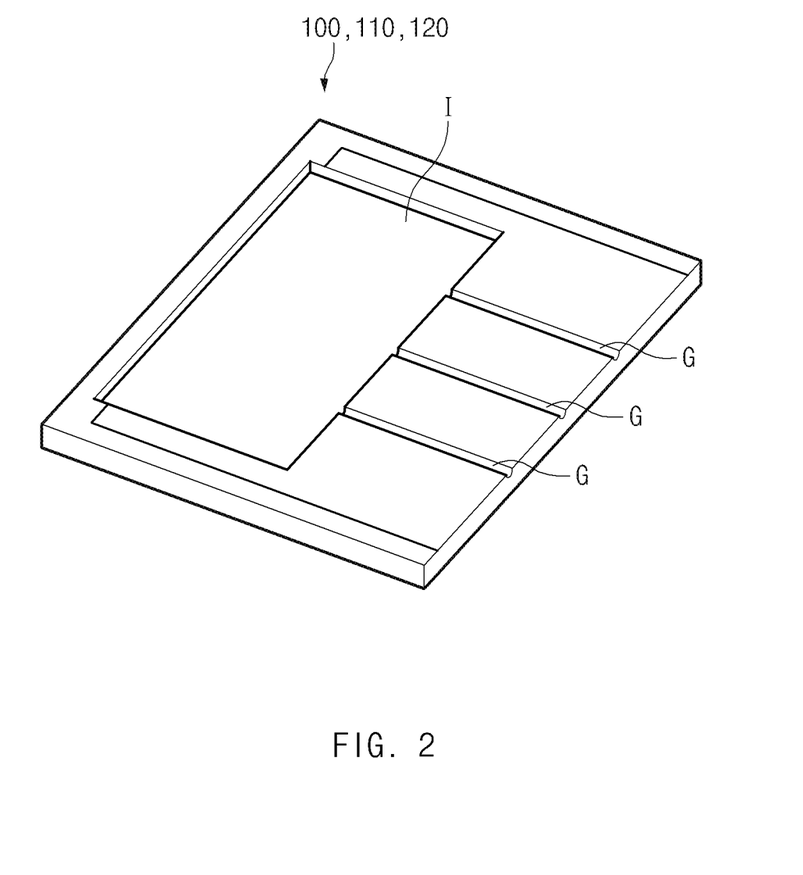
FIG. 2 is a perspective view illustrating a structure of a mold for manufacturing an exterior for a secondary battery according to an embodiment of the present invention.
Figure 3:
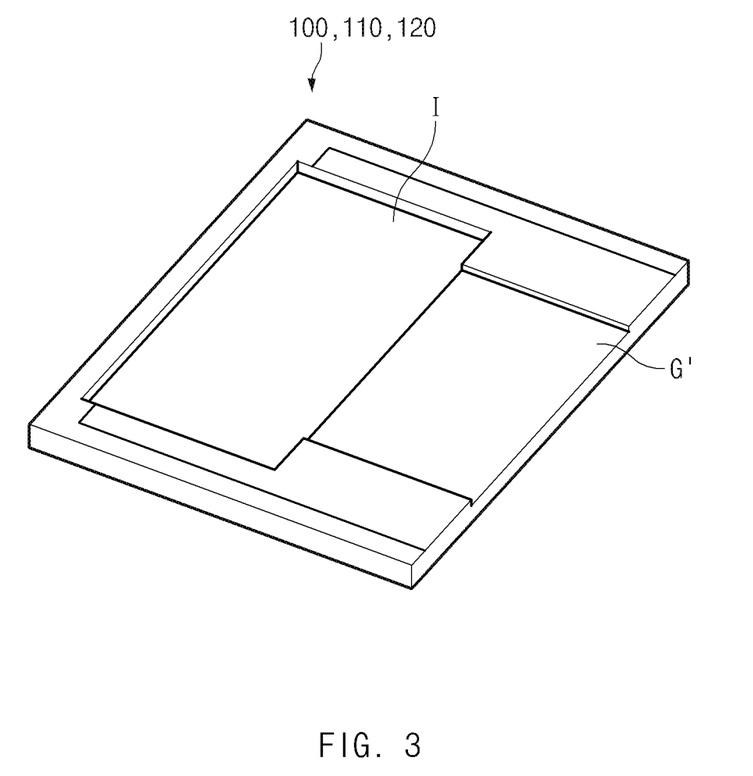
FIG. 3 is a perspective view illustrating a structure of a mold for manufacturing an exterior for a secondary battery according to another embodiment of the present invention.

FIG. 2 is a perspective view illustrating a structure of a mold for manufacturing an exterior for a secondary battery according to an embodiment of the present invention, and FIG. 3 is a perspective view illustrating a structure of a mold for manufacturing an exterior for a secondary battery according to another embodiment of the present invention. Also, FIG. 4 is a perspective view time-sequentially illustrating a state in which a sheet is disposed to face a recess part of a mold according to the present invention, and FIG. 5 is a vertical cross-sectional view illustrating a state in which a first mold and a second mold face each other in the mold according to the present invention.

As illustrated in FIG. 2, an apparatus for manufacturing an exterior for a secondary battery (hereinafter, referred to as a 'manufacturing apparatus') according to an embodiment of the present invention may comprise a mold 100. As illustrated in FIG. 2, a recess part I having a recessed shape may be provided in the mold 100. Here, the recess part I may be spaced a predetermined distance inward from all of an outer circumference of the mold 100.

Figure 4:
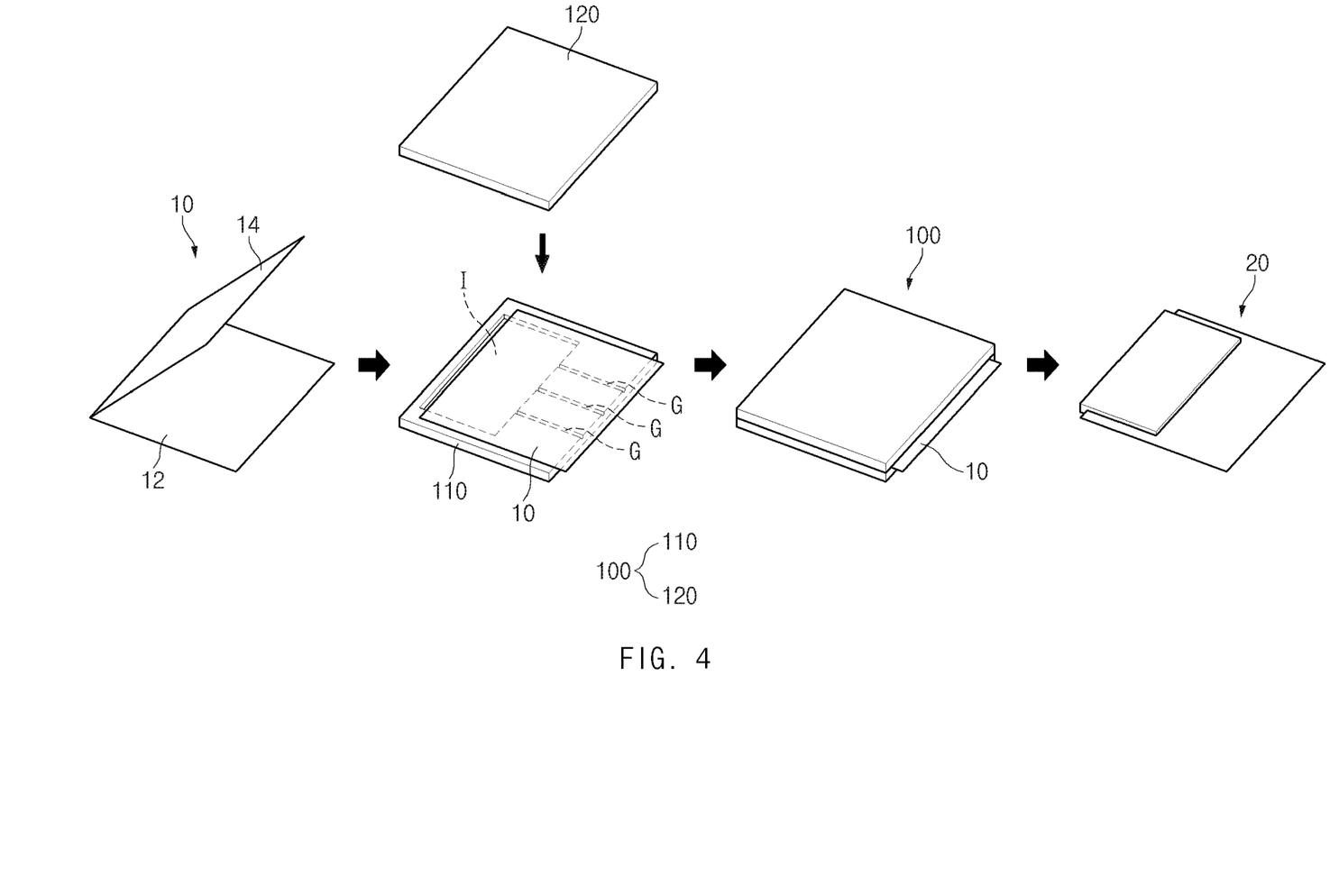
FIG. 4 is a perspective view time-sequentially illustrating a state in which a sheet is disposed to face a recess part of a mold according to the present invention.

As illustrated in FIG. 4, the mold 100 according to the present invention may comprise a first mold 110 and a second mold 120. As illustrated in FIG. 5, the recess part I may be provided in each of both the first mold 110 and the second mold 120. Here, the recess part I of the first mold 110 and the recess part I of the second mold 120 may be provided to face each other. Also, the recess part I of the first mold 110 and the recess par I of the second mold 120 may have the same size and shape. However, unlike this, the recess part I may be provided in only the first mold 110 or the second mold 120.

Figure 5:
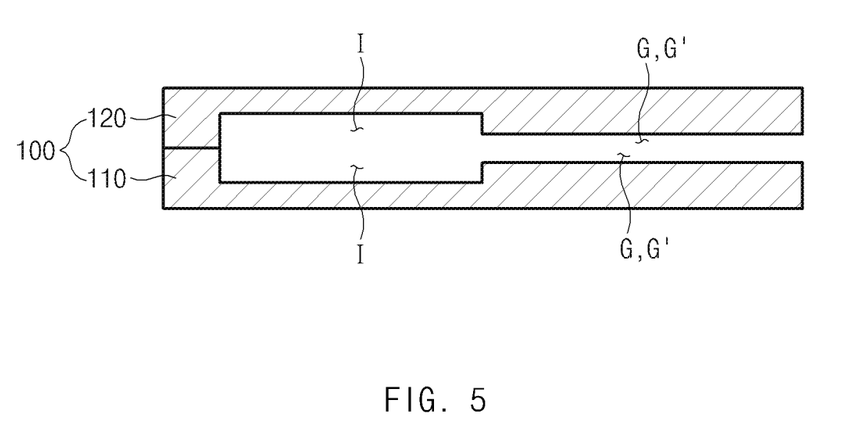
FIG. 5 is a vertical cross-sectional view illustrating a state in which a first mold and a second mold face each other in the mold according to the present invention.

As illustrated in FIGS. 4 and 5, in the manufacturing apparatus according to the present invention, the first mold 110 may be provided at a lower side, and the second mold 120 may be provided at an upper side.

As illustrated in FIGS. 2 and 3, in the manufacturing apparatus according to the present invention, grooves G and G' may be defined in the first mold 110 and the second mold 120. According to an embodiment of the present invention, the groove G defined in the first mold 110 and the second mold 120 may be provided in plurality. According to another embodiment of the present invention, only one groove G' may be defined in the first mold 110 and the second mold 120.

As illustrated in FIG. 2, according to an embodiment of the present invention, the plurality of grooves G defined in the first mold 110 and the second mold 120 may be defined to be regular intervals from each other in a width direction of the first mold 110 and the second mold 120. As illustrated in FIG. 3, according to another embodiment of the present invention, the one groove G' defined in the first mold 110 and the second mold 120 may be defined to extend in the width direction of the first mold 110 and the second mold 120. According to another embodiment of the present invention, the groove G' may have a width ranging from 50% to 100% of a width of each of the first mold 110 and the second mold 120. Also, according to the present invention, the grooves G and G' defined in the first mold 110 and the second mold 120 may extend up to one side of the recess part I as illustrated in FIGS. 2 and 3.

Similar to the case of the recess part I, the grooves G and G' may be defined in both the first mold 110 and the second mold 120, and the grooves G and G' of the first mold 110 and the grooves G and G' of the second mold 120 may be provided to face each other. Also, the grooves G and G' of the first mold 110 and the grooves G and G' of the second mold 120 may have the same size and shape. However, unlike this, the grooves G and G' may be defined in only the first mold 110 or the second mold 120.

As described above, the grooves G and G' may be defined in both the first mold 110 and the second mold 120, and the grooves G and G' of the first mold 110 and the grooves G and G' of the second mold 120 may be provided to face each other. In this case, since the grooves G and G' of the first mold 110 and the grooves G and G' of the second mold 120 face each other, a hole may be defined in the mold 100. Thus, the number of holes defined in the mold 100 may be the same as that of grooves G and G' defined in the first mold 110 and the second mold 120. Therefore, according to an embodiment of the present invention, a plurality of holes may be defined in the mold 100. According to another embodiment of the present invention, one hole may be defined in the mold 100.

A vertical cross-section of the hole defined in the mold 100 according to the present invention may have various shapes. For example, according to an embodiment of the present invention, the vertical cross-section of the hole defined in the mold 100 may have a circular shape, an oval shape, or a rectangular shape. According to another embodiment of the present invention, the vertical cross-section of the hole defined in the mold 100 may have a rod shape that is elongated in a horizontal direction.

Figure 6:
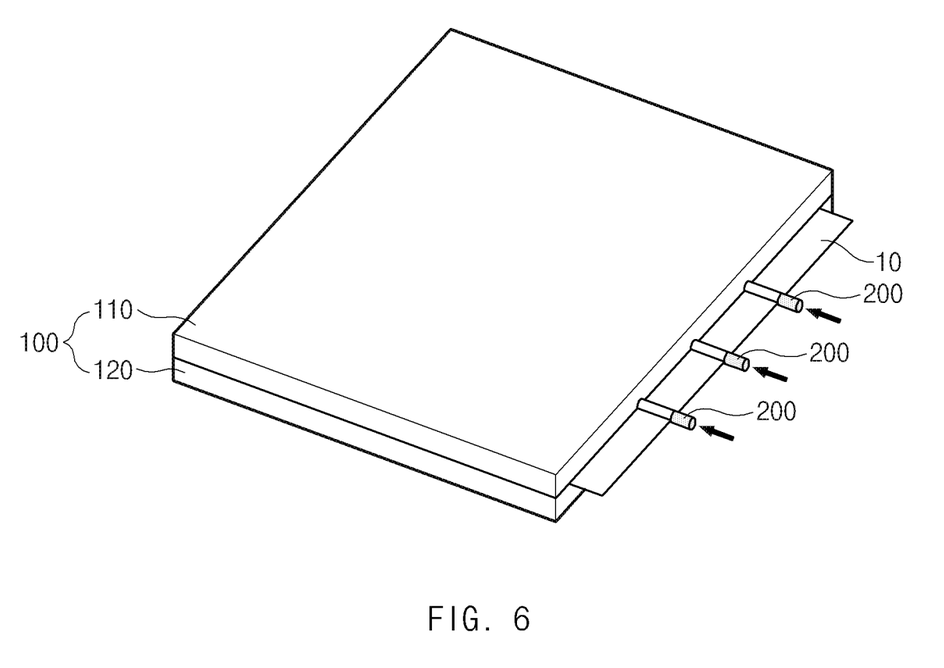
FIG. 6 is a perspective view illustrating a state in which a forming part is provided in a sheet according to an embodiment of the present invention.
Figure 7:
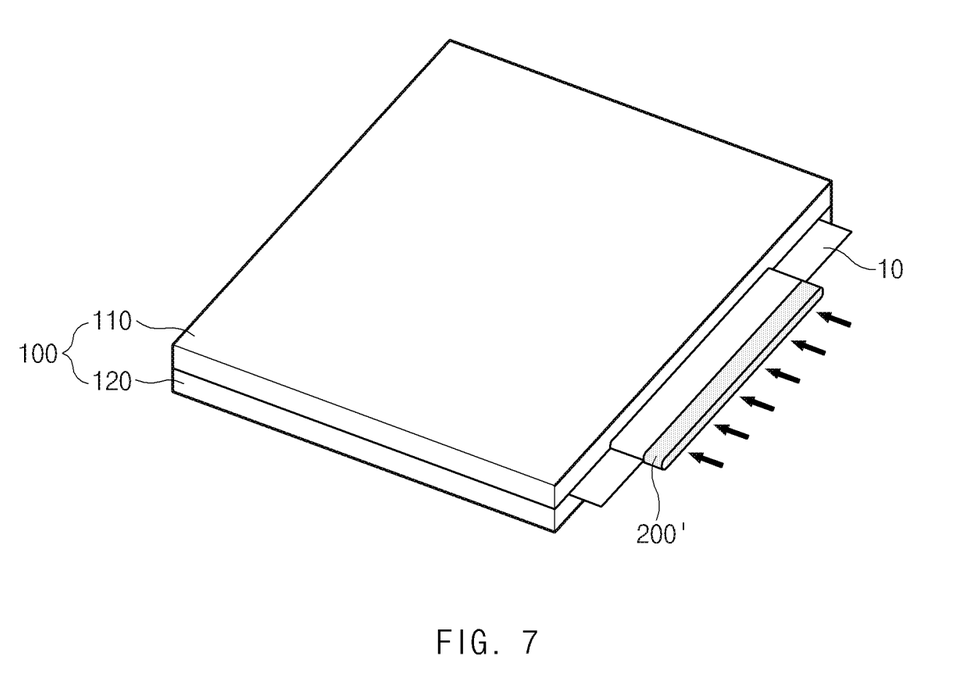
FIG. 7 is a perspective view illustrating a state in which a forming part is provided in a sheet according to another embodiment of the present invention.

FIG. 6 is a perspective view illustrating a state in which a forming part is provided in the sheet according to an embodiment of the present invention, and FIG. 7 is a perspective view illustrating a state in which a forming part is provided in the sheet according to another embodiment of the present invention.

As illustrated in FIGS. 6 and 7, the manufacturing apparatus according to the present invention may further comprise a fluid supply device that supplies a fluid toward the recess part I (see FIGS. 2 to 5) defined in the mold 100. Here, the fluid supply device may comprise duct 200 and 200' extending from a side of the mold 100 toward the recess part I (see FIGS. 2 to 5) to provide a path through which the fluid flows. As illustrated in FIGS. 6 and 7, the ducts 200 and 200' may be inserted into the holes defined by the grooves G and G' (see FIGS. 2 to 5) of the first mold 110 and the second mold 120, which face each other.

Each of the ducts 200 and 200' may have a width corresponding to the width of each of the grooves G and G' (see FIGS. 2 to 5) of the first mold 110 and the second mold 120. Thus, as illustrated in FIG. 6, according to an embodiment of the present invention, the duct 200 may be provided in plurality. The ducts 200 may be spaced apart from each other by a distance spaced between the grooves of the first mold 110 and the second mold 120. Alternatively, as illustrated in FIG. 7, according to another embodiment of the present invention, one duct 200' may be provided to have a width corresponding to a width by which the one groove defined in the first mold 110 and the second mold 120 extends in the width direction of the first mold 110 and the second mold 120.

As described above, the grooves G and G' (see FIGS. 2 to 5) defined in the first mold 110 and the second mold 120 may be connected to the recess part I as illustrated in FIGS. 2 and 3. Thus, the ducts 200 and 200' may extend up to the recess part I (see FIGS. 2 to 5) of the first mold 110 and the recess part I (see FIGS. 2 to 5) of the second mold 120. However, unlike this, the ducts 200 and 200' may extend up to the grooves G and G' (see FIGS. 2 to 5) of the first mold 110 and the grooves G and G' (see FIGS. 2 to 5) of the second mold 120.

Method for Manufacturing Exterior for Secondary Battery

Hereinafter, a method of manufacturing an exterior for a secondary battery according to the present invention will be described with reference to the above contents and FIGS. 1 to 8.

Referring to FIGS. 2 to 5, a method for manufacturing an exterior for a secondary battery according to the present invention may comprise a first step of preparing a mold 100, in which a recess part I is formed, and a sheet 10, and a second step of locating the sheet 10 so that a portion of the sheet 10 faces the recess part I.

Here, in the first step, the mold 100 may comprise a first mold 110 and a second mold 120 disposed above the first mold 110.

Also, in the second step, a portion of the sheet 10 may be disposed between the first mold 110 and the second mold 120. Here, the recess part I of the first mold 110 and the recess part I of the second mold 120 may be provided to face each other.

As illustrated in FIG. 4, in the second step, the sheet 10 may be disposed in a folded state between the first mold 110 and the second mold 120. Thus, as illustrated in FIG. 4, the sheet 10 may be divided into a first sheet part 12 and a second sheet part 14 by using a folded area as a boundary. FIG. 4 illustrates a state in which the first sheet part 12 is disposed adjacent to the first mold 110, and the second sheet part 14 is disposed adjacent to the second mold 120 in the second step. Also, in the second step, the sheet 10 may be disposed so that a boundary between the first sheet part 12 and the second sheet part 14, i.e., the folded area of the sheet is directed toward the inside the molds 110 and 120.

As illustrated in FIG. 4, in the second step, the sheet may be disposed so that a portion of an area of the recess part I faces the sheet 10, and the other portion of the area of the recess part I does not face the sheet 10. That is, according to the present invention, in the second step, the recess part I of each of the first mold 110 and the second mold 120 and the sheet 10 may overlap each other in only a partial area. FIG. 4 illustrates a state in which a partial area of the recess part of the first mold 110 and a partial area of the first sheet part 12 of the sheet 10 may overlap each other, and a partial area of the recess part of the second mold 120 and a partial area of the second sheet part 14 of the sheet 10 may overlap each other.

Referring to FIGS. 6 and 7, the method for manufacturing the exterior for the secondary battery according to the present invention further comprises a third step of supplying the fluid from the side of the mold 100 toward the recess part I (see FIGS. 2 to 5) to form a forming part 22 (see FIG. 8) having a shape corresponding to that of the recess part I in an area of the sheet 10, which is provided on the recess part I.

As illustrated in FIGS. 6 and 7, in the third step, the fluid supplied toward the recess part may be introduced into a space between the first sheet part 12 (see FIG. 4) and the second sheet part 14 (see FIG. 4).

In the third step, the fluid supplied toward the recess part may be a fluid that does not react with the sheet. For example, the fluid may be air or a liquid that does not react with the sheet. Thus, according to the present invention, in the third step, it is possible to prevent the sheet or a surface of the sheet from being denaturalized due to the reaction between the fluid and the sheet.

As described above, the recess part I (see FIGS. 2 to 4) of the mold 100 may be spaced a predetermined distance inward from all outer circumferences of the mold 100.

Thus, in the third step, a circumference of the first recess part I (see FIGS. 2 to 5) of the first mold 110 of the mold 100 and a circumference of the second recess part I (see FIGS. 2 to 5) of the second mold 120 of the mold 100 are pressed by each other so that the recess part I of the first mold 110 and the recess part I of the second mold 120 face each other to seal an inner space from the outside. The inner space formed by the recess part of the first mold and the recess part of the second mold may be sealed from the outside through the above-described pressing, and simultaneously, in the third step, even though the fluid is supplied to the recess part of each of the first mold and the second mold, an area disposed on a circumference of the recess part of each of the first mold and the second mold may be fixed at one point without being slipped on the first mold and the second mold.

As described above, in the second step, the sheet 10 may be disposed so that a portion of an area of the recess part I of the mold 100 may face the sheet 10, and the other portion of the area of the recess part I of the mold 100 does not face the sheet 10.

However, in the third step, since the area of the sheet 10, which faces the recess part I of the mold 10, is elongated in a moving direction of the fluid by a pressure of the fluid supplied to the recess part I of the mold 100, at least a portion of the area of the recess part I, which does not face the sheet 10 in the second step, may face the sheet 10. However, even in this case, the area disposed on the circumference of the recess part of each of the first mold 110 and the second mold 120 may be fixed through the pressing between the first mold 110 and the second mold 120 without being slipped on the first mold and the second mold.

More preferably, in the third step, since the area of the sheet 10, which faces the recess part I of the mold 100, is elongated by the pressure of the fluid supplied to the recess part I of the mold 100, the entire area of the recess part I, which does not face the sheet 10 in the second step, may face the sheet 10.

Exterior for Secondary Battery

Figure 8:
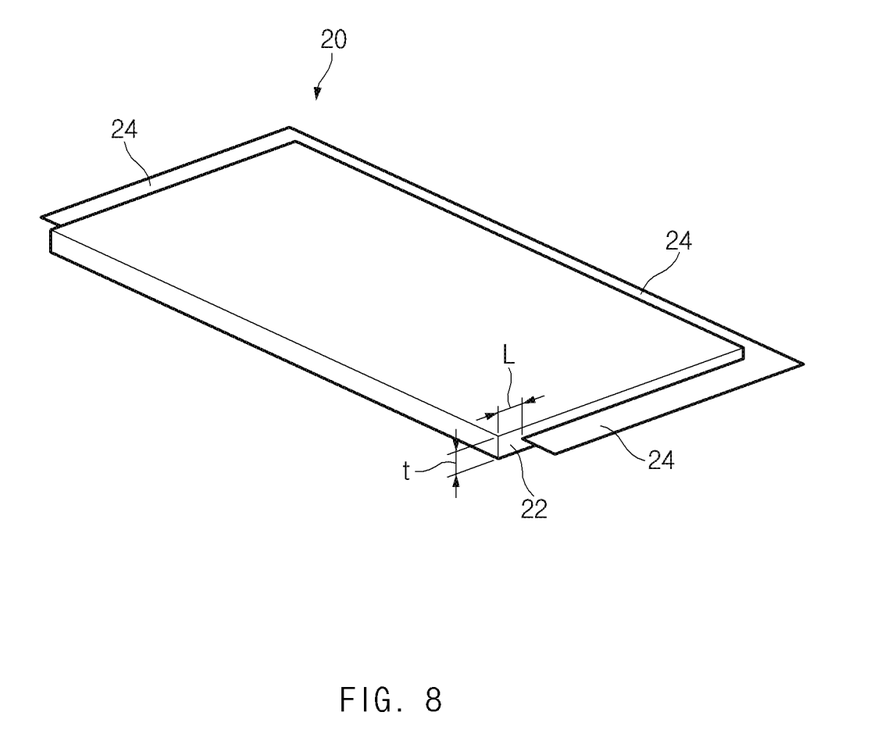
FIG. 8 is a perspective view illustrating a shape of an exterior for a secondary battery manufactured according to the present invention.

FIG. 8 is a perspective view illustrating a shape of an exterior for the secondary battery manufactured according to the present invention.

An exterior 20 for a secondary battery according to the present invention (hereinafter, referred to as an 'exterior') may comprise a forming part 22 having a predetermined thickness t and defining a space therein and a sealing part disposed on a circumference of the forming part 22.

The space defined in the forming part 22 of the exterior 20 may have a size and shape, which correspond to those of the above-described inner space defined by the recess part I of the first mold 110 and the recess part of the second mold 120, which face each other. Also, the sealing part 24 of the exterior 20 may have a size and shape corresponding to those of a circumference of the recess part I of the first mold 110 of the above-described mold 100, or a circumference of the recess part I of the second mold 120 of the mold 100.

As described above, in the third step of the method for manufacturing the exterior for the secondary battery according to the present invention, since the circumference of the recess part I of the first mold 110 and the circumference of the recess part I of the second mold 120 are pressed by each other, the areas of the first sheet part 12 and the second sheet part 14, which are disposed between the circumference of the recess part I of the first mold 110 and the circumference of the recess part I of the second mold 120 may be bonded to each other. Therefore, as illustrated in FIG. 8, the entire area of the sealing part 24 of the exterior 20 may have a structure in which the two sheets are bonded to each other.

Also, as described above, in the third step of the method for manufacturing the exterior for the secondary battery according to the present invention, the area of the sheet 10, which faces the recess part I of the mold 100, may be elongated in a moving direction of a fluid. Therefore, as illustrated in FIG. 8, the sealing part 24 may be spaced a predetermined length L from one side surface of the forming part 22.

In more detail, the circumference of the forming part 22 of the exterior 20 may be constituted by four side surfaces. Also, the sealing part 24 may be disposed along three side surfaces of the four side surfaces on the circumference of the forming part 22. Here, the sealing part 24 may be spaced the predetermined length L from one side surface, on which the sealing part 24 is not disposed, among the four side surfaces on the circumference of the forming part 22.

According to the present invention, since the exterior 20 for the secondary battery is manufactured so that the sealing part 24 is spaced a predetermined length L from the one side surface of the forming part 22, the sealing part 3 (see FIG. 1) of the pouch type exterior manufactured according to the related art may not be deviated from the width of the secondary battery 1 (see FIG. 1) to remove the dead space occurring in the sealing part, thereby improving the energy density of the secondary battery.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A method for manufacturing an exterior for a secondary battery, the method comprising:
   a first step of preparing a sheet and a mold in which a recess part having a recessed shape is formed;
   a second step of locating the sheet so that a portion of the sheet faces the recess part of the mold; and
   a third step of supplying a fluid from a side of the mold toward the recess part to form a forming part having a shape corresponding to a shape of the recess part in an area of the sheet, which is provided on the recess part,
   wherein, in the first step, the mold comprises a first mold and a second mold provided above the first mold,
   wherein, in the second step, a portion of the sheet is provided between the first mold and the second mold, wherein a first recess part of the first mold and a second recess part of the second mold are provided to face each other, wherein the recess part of the mold comprises the first and second recess parts, and
   wherein, in the second step, the sheet is folded, and the sheet is disposed between the first mold and the second mold in a state in which the sheet is divided into a first sheet part and a second sheet part by using a folded area as a boundary,
   wherein, in the second step, the folded area of the sheet defines a fold that extends across the recess part so that a portion of the recess part faces the sheet, and another portion of the recess part does not face the sheet, wherein the portion of the recess part and the another portion of the recess part are on opposing sides of the fold.

2. The method of claim 1, wherein
in the third step, the fluid is introduced between the first sheet part and the second sheet part.

3. The method of claim 1, wherein, in the third step, a circumference of the recess part of the first mold of the mold and a circumference of the recess part of the second mold of the mold are pressed with respect to each other to seal an inner space formed by the recess part of the first mold and the recess part of the second mold, which face each other, from an outside.

4. The method of claim 1, wherein, in the third step, an area of the sheet, which faces the recess part is elongated by the supplied fluid, and at least a portion of the another portion of the recess part, which does not face the sheet in the second step, faces the sheet.

5. The method of claim 1, wherein the fluid is air.

6. The method of claim 1, wherein the fluid is a liquid that does not react with the sheet.

\* \* \* \* \*